Patented Jan. 12, 1943

2,307,794

UNITED STATES PATENT OFFICE 2,307,794

PROCESS FOR PRODUCING SYNTHETIC ESTERS

Wesley A. Jordan, Chicago, Ill., assignor to The Sherwin-Williams Company, a corporation of Ohio No Drawing. Application December 30, 1939, Serial No. 311,819

8 Claims. (Cl. 260—411)

This invention relates to the production of synthetic esters, and particularly synthetic drying oil esters derived from the esterification of a fatty acid having a plurality of unsaturated linkages with a polyhydric alcohol.

In effecting esterification of a fatty acid ester with a polyhydric alcohol the reaction results in the liberation of water, which must be removed. Ordinarily there are also produced certain ethers resulting from the condensation of the hydroxyl groups of the alcoholic bodies. Such production of ethers is undesirable, particularly where the acid employed is that of a drying oil ester, as they reduce the theoretical maximum esterification. Their presence is undesirable in that they reduce the drying properties of the ester.

The main object of the present invention is to reduce the extent of ether formation, reduce the acid number of the product, and secure a drying oil ester having superior drying properties.

In order to facilitate the rapid removal of the water formed by the esterification, and without raising the temperature undesirably high, it has heretofore been proposed to blow carbon dioxide through the heated mixture.

Although the removal of the water resulting from esterification is necessary, I have discovered that such removal may be effected and the objects of the present invention achieved by adding further water in the form of superheated steam.

The esterification in a mixture of drying oil acids and a polyhydric alcohol proceeds at atmospheric or subatmospheric pressure when superheated steam is passed through the mixture, but to prevent condensation of the steam it is obvious that the mixture should be at a temperature above that of boiling water while injecting the superheated steam into the mixture. It will be noted that the substance injected into the mixture is the same as the product of reaction which is to be removed.

Experiments have proven that by the passage of superheated steam through the mixture during the esterification, many important advantages are secured in the production of drying oil esters. When the agitation during esterification is accomplished by the use of steam instead of an inert gas such as carbon dioxide, the formation of ethers of the polyhydric alcohols is reduced to a minimum, and the drop of acetyl value follows theoretically the reduction of the acid value. When carbon dioxide is employed for agitation, the drop in acetyl value is greater than the corresponding drop of acid value. Furthermore, by the use of steam for agitation, the final product shows a lower acid value than an ester synthesized while employing carbon dioxide. The reasons why such improved results are obtained by the use of steam instead of carbon dioxide are not entirely clear, as experience in using steam and carbon dioxide for scouring purposes in other reactions would lead one to believe that they would act the same when used for agitation of a mixture undergoing esterification.

Although many different unsaturated fatty acids may be employed, it is desirable in the preparation of a drying oil ester that the acid be that of a drying oil. For example, highly satisfactory results have been obtained by the use of Neofat #19 acids, which are those derived from fish oil, and which are composed essentially of unsaturated fatty acids having 20 or 22 carbon atoms in the chain and with 3 or 4 double bonds and containing minor portions of other fatty acids such as oleic, linoleic and linolenic acids. I may employ the acids of perilla oil, soya bean oil, linseed oil, or other such drying oils.

Various polyhydric alcohols containing three or more hydroxyl radicals may be employed, such as glycerol, pentaerythritol, mannitol, etc.

In the present process the acid may be employed for dehydrating an oil having a hydroxyl radical in the carbon chain, such for instance as castor oil. I will describe merely as an example one procedure which may be employed for making a drying oil ester using castor oil 93.2 parts, Neofat #19 acids 90 parts, and glycerol 9.2 parts. The castor oil was mixed with the Neofat #19 acids and heated to 585° F. and held there one hour. As a result the castor oil was dehydrated with the formation of a second double bond in the chain, as described and claimed in copending application Serial No. 311,818, filed on even date herewith. The mixture was allowed to cool to 420° F., and the glycerol was added. Superheated steam was employed for agitation during the esterification which took place between the acids and the glycerol, and certain interchange of acid radicals took place whereby the product became a mixed glyceride of the acid of the castor oil and the Neofat #19 acids.

The acid value of the resulting ester obtained was 3.3, which indicated the preservation of hydroxyl groups during esterification by steam. A 54 gallon limed rosin varnish was made from this material which showed rapid drying and an improved film. When the same ingredients in the same proportions were reacted in the same manner, but with agitation by carbon dioxide gas, the lowest acid value obtained was 5.6, and the limed rosin varnish showed very poor drying properties and a less desirable film. With the steam agitation the varnish dried faster and a harder film was formed from the varnish than was obtained when carbon dioxide was employed for agitation.

As above noted, it is not essential to the present process that an oil be used as one of the ingredients or that there be any dehydration of such oil, although such dehydration of an oil containing a hydroxyl group and the formation of the mixed ester results in a highly desirable product.

So far as concerns the inhibiting of the formation of ethers and the reduction of acid number, and the increase in the extent of esterification, it is not essential that the acid employed by an unsaturated one, although that is highly desirable, if not necessary, in the formation of a drying oil ester for coating compositions.

It will be obvious that if other acids be employed and if other polyhydric alcohols be employed, the relative proportions of the ingredients should be varied in accordance with the molecular weights, the number of replaceable hydroxyl groups in the alcohol, and the basicity of the acid.

Having thus described my invention, what I claim as new and desire to secure by Letters Patent is:

1. The process of esterification of a higher fatty acid and a polyhydric alcohol, which includes maintaining a mixture of said acid and alcohol in liquid phase at a temperature above that of boiling water, and agitating the mixture by the use of superheated steam.

2. The process of synthesizing an improved drying oil, which includes esterifying a poly-unsaturated higher fatty acid with a polyhydric alcohol while agitating the mixture in liquid phase with superheated steam.

3. The process of inhibiting ether formation during the synthesis of drying oil esters from a higher fatty acid and a polyhydric alcohol, which includes passing superheated steam through the material during the esterification.

4. The process of forming a synthetic drying oil, which includes esterifying the poly-unsaturated higher fatty acid of a drying oil with a polyhydric alcohol having at least three hydroxyl groups, removing the water of reaction and inhibiting ether formation by passing superheated steam through the mixture in liquid phase during esterification.

5. The process of forming a synthetic drying oil ester, which includes heating castor oil and a drying oil acid at a temperature of about 585° F., cooling the mixture to about 420° F., adding glycerol, and agitating the mixture in liquid phase by passing superheated steam therethrough to thereby inhibit ether formation.

6. The process which consists in heating 93.2 parts of castor oil with 90 parts of a mixture of unsaturated fatty acids composed essentially of those having 20 or 22 carbon atoms in the chain, and with 3 or 4 double bonds, and containing minor portions of unsaturated fatty acids having 18 carbon atoms in the chain to effect dehydration of the castor oil, adding 9.2 parts of glycerol to form a mixed ester, and agitating the mixture in liquid phase with superheated steam during the esterification, thereby removing water and inhibiting ether formation.

7. The process of forming a synthetic drying oil ester, which includes heating castor oil with a mixture of poly-unsaturated fatty acids composed essentially of those having 18, 20 and 22 carbon atoms in the chain to effect dehydration of the castor oil, adding a polyhydric alcohol to form a mixed ester, and agitating the mixture in liquid phase with superheated steam during the esterification, thereby removing water and inhibiting ether formation.

8. The process of forming a synthetic drying oil, which includes esterifying a mixture of dehydrated castor oil and the acids of fish oil with a polyhydric alcohol having at least 3 hydroxyl groups, and removing the water of reaction and inhibiting ether formation by passing superheated steam through the mixture in liquid phase during esterification.

WESLEY A. JORDAN.